(12) United States Patent
Lan

(10) Patent No.: US 10,050,909 B2
(45) Date of Patent: Aug. 14, 2018

(54) METHOD AND DEVICE FOR DETERMINING TRANSMISSION BUFFER SIZE

(71) Applicant: Huawei Technologies Co., Ltd., Shenzhen (CN)

(72) Inventor: Haiqing Lan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 109 days.

(21) Appl. No.: 15/382,182

(22) Filed: Dec. 16, 2016

(65) Prior Publication Data

US 2017/0099237 A1 Apr. 6, 2017

Related U.S. Application Data

(63) Continuation of application No. PCT/CN2014/080719, filed on Jun. 25, 2014.

(51) Int. Cl.
*H04L 12/26* (2006.01)
*H04L 12/861* (2013.01)

(52) U.S. Cl.
CPC ...... *H04L 49/9005* (2013.01); *H04L 43/0858* (2013.01); *H04L 43/0894* (2013.01)

(58) Field of Classification Search
None
See application file for complete search history.

(56) References Cited

U.S. PATENT DOCUMENTS 6,208,619 B1* 3/2001 Takeuchi ............... H04L 47/10
370/229
8,787,163 B1* 7/2014 Nemavat ............... H04L 12/54
370/231
(Continued)

FOREIGN PATENT DOCUMENTS

CN 101534242 A 9/2009
CN 102201997 A 9/2011
(Continued)

OTHER PUBLICATIONS

Machine Translation and Abstract of Japanese Publication No. JP2005198111, Jul. 21, 2005, 53 pages.
(Continued)

*Primary Examiner* — Rebecca E Song
(74) *Attorney, Agent, or Firm* — Conley Rose, P.C.

(57) ABSTRACT

A method for determining a transmission buffer size, including acquiring a transmission delay of a data packet that is sent by a transmit end on a transmission link between the transmit end and a receive end, updating a minimum transmission delay according to the transmission delay and based on a first update period when a primary congestion status of the transmission link is congested, updating the minimum transmission delay according to the transmission delay and based on a second update period when the primary congestion status is non-congested, where a period length of the first update period is shorter than a period length of the second update period, obtaining a minimum transmission delay of the transmission link, and determining a transmission buffer size of the transmission link according to the transmission delay and the minimum transmission delay.

20 Claims, 5 Drawing Sheets

(56) References Cited

U.S. PATENT DOCUMENTS

| | | | |
|---|---|---|---|
| 2004/0111541 | A1 | 6/2004 | Meyer et al. |
| 2005/0226156 | A1* | 10/2005 | Keating ................ H04L 47/10 370/235 |
| 2005/0286416 | A1 | 12/2005 | Shimonishi et al. |
| 2010/0296406 | A1 | 11/2010 | Rahbar |
| 2011/0317583 | A1 | 12/2011 | Tsuda |
| 2012/0016986 | A1 | 1/2012 | Jacquet et al. |
| 2014/0146682 | A1 | 5/2014 | Kakadia et al. |
| 2014/0192639 | A1 | 7/2014 | Smirnov et al. |

FOREIGN PATENT DOCUMENTS

| | | | |
|---|---|---|---|
| CN | 102457486 | A | 5/2012 |
| JP | H11098142 | A | 4/1999 |
| JP | 2004532566 | A | 10/2004 |
| JP | 2005198111 | A | 7/2005 |
| JP | 2006014329 | A | 1/2006 |
| JP | 2012009987 | A | 1/2012 |
| JP | 2012515491 | A | 7/2012 |
| JP | 5324412 | B2 | 10/2013 |
| WO | 2004034627 | A2 | 4/2004 |
| WO | 2013123261 | A2 | 8/2013 |

OTHER PUBLICATIONS

Machine Translation and Abstract of Japanese Publication No. JPH1198142, Apr. 9, 1999, 15 pages.
Foreign Communication From a Counterpart Application, Japanese Application No. 2016-571211, Japanese Notice of Allowance dated Jan. 24, 2018, 2 pages.
Machine Translation and Abstract of Chinese Publication No. CN101534242, Sep. 16, 2009, 21 pages.
Machine Translation and Abstract of Chinese Publication No. CN102201997, Sep. 28, 2011, 18 pages.
Machine Translation and Abstract of Chinese Publication No. CN102457486, May 16, 2012, 10 pages.
Foreign Communication From a Counterpart Application, European Application No. 14895571.9, Extended European Search Report dated Mar. 29, 2017, 8 pages.
Foreign Communication From a Counterpart Application, PCT Application No. PCT/CN2014/080719, English Translation of International Search Report dated Mar. 27, 2015, 2 pages.
Foreign Communication From a Counterpart Application, PCT Application No. PCT/CN2014/080719, English Translation of Written Opinion dated Mar. 27, 2015, 6 pages.

* cited by examiner

METHOD AND DEVICE FOR DETERMINING TRANSMISSION BUFFER SIZE

CROSS-REFERENCE TO RELATED APPLICATION

This application is a continuation of International Application No. PCT/CN2014/080719, filed on Jun. 25, 2014 which is hereby incorporated by reference in its entirety.

TECHNICAL FIELD

The present disclosure relates to the field of communications technologies, and in particular, to a method and device for determining a transmission buffer size.

BACKGROUND

Data packet transmission is a communication mode generally used in a modern communications system. A transmit end sends a data packet to a receive end through a transmission link. However, transmission congestion or a transmission error on a transmission link may cause a data packet loss. The transmission link discards a data packet that fails to be sent when transmission congestion occurs on the transmission link, that is, a data packet sending demand is beyond a transport capability of the transmission link. In this case, to ensure quality of a communications service, a method of flow control is generally used to reduce a data packet loss. When a transmission error occurs on the transmission link, for example, the transmission link experiences interference, an error occurs on all or partial bits of a data packet, and the receive end discards an erroneous data packet, which results in a data packet loss. In this case, a data packet loss can be reduced by means of reducing interference. A severity level of a data packet loss can be indicated by a loss packet ratio (LPR), and the LPR can be calculated by a quantity of data packets sent by a transmit end and a quantity of data packets received by a receive end.

In other approaches, usually the LPR is directly used for determining a congestion status of a transmission link. However, since a data packet loss on a transmission link may be caused by congestion or a transmission error, it is inaccurate to determine the congestion status only by the LPR, and the congestion status of the transmission link cannot be accurately reflected, which causes inaccuracy of flow control and affects quality of a communications service.

SUMMARY

Embodiments of the present disclosure provide a method for determining a transmission buffer size, which can improve accuracy of the transmission buffer size on a transmission link and further can determine a congestion status of the transmission link more accurately.

A first aspect of the present disclosure provides a method for determining a transmission buffer size, where the method includes acquiring a transmission delay of a data packet that is sent by a transmit end on a transmission link between the transmit end and a receive end, updating on a minimum transmission delay according to the transmission delay and based on a first update period if a primary congestion status of the transmission link is congested, updating the minimum transmission delay according to the transmission delay and based on a second update period if the primary congestion status is non-congested, where a period length of the first update period is shorter than a period length of the second update period, obtaining the minimum transmission delay of the transmission link, and determining a transmission buffer size of the transmission link according to the transmission delay and the minimum transmission delay.

With reference to the first aspect, in a first implementation manner of the first aspect, determining a transmission buffer size of the transmission link according to the transmission delay and the minimum transmission delay includes performing dejittering processing on the transmission delay to obtain an anti-interference transmission delay of the transmission link, and using a difference between the anti-interference transmission delay and the minimum transmission delay as the transmission buffer size, or calculating a difference between the transmission delay and the minimum transmission delay, and using the difference as the transmission buffer size.

With reference to the first implementation manner of the first aspect, in a second implementation manner of the first aspect, performing dejittering processing on the transmission delay to obtain an anti-interference transmission delay of the transmission link includes obtaining the anti-interference transmission delay of the transmission link according to an anti-interference transmission delay calculation function $T_{delay}=f_1(T)$ and the transmission delay, where $T_{delay}$ is the anti-interference transmission delay, T is the transmission delay, and $f_1$ is a low-pass filtering function.

With reference to the first aspect or any of the foregoing implementation manners, in a third implementation manner of the first aspect, the method further includes determining a transmission bandwidth of the transmit end on the transmission link according to the transmission buffer size, or determining a transmission bandwidth variation on the transmission link according to the transmission buffer size, or determining a high-level congestion status parameter of the transmission link according to the transmission buffer size, where the high-level congestion status parameter is used to indicate a congestion level of the transmission link.

With reference to the third implementation manner of the first aspect, in a fourth implementation manner of the first aspect, determining a transmission bandwidth of the transmit end on the transmission link according to the transmission buffer size includes determining the high-level congestion status parameter of the transmission link according to the transmission buffer size, and determining the transmission bandwidth according to the high-level congestion status parameter, or determining the transmission bandwidth according to a correspondence between the transmission buffer size and the transmission bandwidth and a correspondence between a preset transmission buffer size and the transmission bandwidth.

With reference to the third or fourth implementation manner of the first aspect, in a fifth implementation manner of the first aspect, determining a high-level congestion status parameter of the transmission link according to the transmission buffer size includes determining the high-level congestion status parameter of the transmission link according to a value relationship between the transmission buffer size and preset buffer size thresholds, where the preset buffer size thresholds include at least two thresholds.

With reference to the fifth implementation manner of the first aspect, in a sixth implementation manner of the first aspect, the preset buffer size threshold is $MemLengthTd_1$, $MemLengthTd_2$, ..., and $MemLengthTd_N$, N is an integer greater than 2, and $MemLengthTd_1 < MemLengthTd_2 < ..., < MemLengthTd_N$. The high-level congestion status parameter of the transmission link is $TranCongestion_t$, a value of i is set to 1, . . . , N, and N+1 respectively, and a congestion level indicated by $TranCongestion_{i+1}$ is severer than a congestion level indicated by $TranCongestion_i$, and determining the high-level congestion status parameter of the transmission link according to a value relationship between the transmission buffer size and preset buffer size thresholds includes determining that the high-level congestion status parameter of the transmission link is $TranCongestion_{j+1}$ when the transmission buffer size is greater than $MemLengthTd_j$ and the transmission buffer size is less than or equal to $MemLengthTd_{j+1}$, where $1<j<N$, and j is an integer, or determining that the high-level congestion status parameter of the transmission link is $TranCongestion_1$ when the transmission buffer size is greater than or equal to 0 and the transmission buffer size is less than or equal to $MemLengthTd_1$, or determining that the high-level congestion status parameter of the transmission link is $TranCongestion_{N+1}$ when the transmission buffer size is greater than $MemLengthTd_N$.

With reference to the third or fourth implementation manner of the first aspect, in a seventh implementation manner of the first aspect, determining a high-level congestion status parameter of the transmission link according to the transmission buffer size includes determining a transmission buffer size variable of the transmission link according to the transmission buffer size and a previous transmission buffer size neighboring to the transmission buffer size, and determining the high-level congestion status parameter of the transmission link according to the transmission buffer size, the transmission buffer size variable, and a relationship among a preset transmission buffer size, the transmission buffer size variable, and the high-level congestion status parameter.

With reference to the seventh implementation manner of the first aspect, in an eighth implementation manner of the first aspect, the relationship among the preset transmission buffer size, the transmission buffer size variable, and the high-level congestion status parameter is $TranCongestion=f_2$ ($\Delta MemLength$, $MemLength$), where $TranCongestion$ is the high-level congestion status parameter of the transmission link, and a larger value of $TranCongestion$ indicates a severer congestion level of the transmission link, $\Delta MemLength$ is the transmission buffer size variable, $MemLength$ is the transmission buffer size, and the function $f_2$ meets conditions (a), (b) and (c), where the conditions (a), (b) and (c) are as follows.

(a) In a case in which a value of $MemLength$ is set to X, and X is any non-negative number, a first $TranCongestion=f_2$(the first $\Delta MemLength$, X) when a value of $\Delta MemLength$ is set to a first $\Delta MemLength$, a second $TranCongestion=f_2$(the second $\Delta MemLength$, X) when the value of $\Delta MemLength$ is set to a second $\Delta MemLength$, and the first $TranCongestion<$the second $TranCongestion$ if the first $\Delta MemLength<$the second $\Delta MemLength$;

(b) In a case in which the value of $\Delta MemLength$ is set to Y, and Y is an arbitrary number, a third $TranCongestion=f_2$(Y, the first $MemLength$) when the value of $MemLength$ is set to a first $MemLength$, a fourth $TranCongestion=f_2$(Y, the second $MemLength$) when the value of $MemLength$ is set to a second $MemLength$, and the third $TranCongestion<$the fourth $TranCongestion$ if the first $MemLength<$the second $MemLength$; and (c) A fifth $TranCongestion=f_2$(the third $\Delta MemLength$, the third $MemLength$) when the value of $MemLength$ is set to a third $MemLength$, and the value of $\Delta MemLength$ is set to a third $\Delta MemLength$, and a sixth $TranCongestion=f_2$(the fourth $\Delta MemLength$, the fourth $MemLength$) when the value of $MemLength$ is set to a fourth $MemLength$, and the value of $\Delta MemLength$ is set to a fourth $\Delta MemLength$, where the fifth $TranCongestion<$the sixth $TranCongestion$ if the third $MemLength<$the fourth $MemLength$, and the third $\Delta MemLength$/the third $MemLength=$the fourth $\Delta MemLength$/the fourth $MemLength>0$, or the fifth $TranCongestion>$the sixth $TranCongestion$ if the third $MemLength<$the fourth $MemLength$, and the third $\Delta MemLength$/the third $MemLength=$the fourth $\Delta MemLength$/the fourth $MemLength<0$.

With reference to the fourth implementation manner of the first aspect, in a ninth implementation manner of the first aspect, determining the transmission bandwidth according to the high-level congestion status parameter includes determining that the transmission bandwidth of the transmission link is a first transmission bandwidth according to a correspondence between the first high-level congestion status parameter and the transmission bandwidth and a correspondence between a preset high-level congestion status parameter and the transmission bandwidth if the high-level congestion status parameter is a first high-level congestion status parameter, and determining that the transmission bandwidth of the transmission link is a second transmission bandwidth according to a correspondence between the second high-level congestion status parameter and the transmission bandwidth and the correspondence between the preset high-level congestion status parameter and the transmission bandwidth if the high-level congestion status parameter is a second high-level congestion status parameter, where the correspondence between the preset high-level congestion status parameter and the transmission bandwidth meets conditions, the first transmission bandwidth is less than the second transmission bandwidth if the first high-level congestion status parameter is greater than the second high-level congestion status parameter, the first transmission bandwidth is greater than the second transmission bandwidth if the first high-level congestion status parameter is less than the second high-level congestion status parameter, and the first transmission bandwidth is equal to the second transmission bandwidth if the first high-level congestion status parameter is equal to the second high-level congestion status parameter.

With reference to the fourth implementation manner of the first aspect, in a tenth implementation manner of the first aspect, determining the transmission bandwidth according to the high-level congestion status parameter includes acquiring a current transmission bandwidth $BW_{old}$ of the transmission link, and determining the transmission bandwidth according to the high-level congestion status parameter, $BW_{old}$, and a transmission bandwidth function $BW_{new}=f_3$ ($TranCongestion$, $BW_{old}$), where $TranCongestion$ is the high-level congestion status parameter, $BW_{new}$ is the transmission bandwidth, and a larger value of $TranCongestion$ indicates a severer congestion level of the transmission link, where the function $f_3$ meets conditions, a first $BW_{new}=f_3$(the first $TranCongestion$, $BW_{old}$) when a value of $TranCongestion$ is set to a first $TranCongestion$, a second $BW_{new}=f_3$(the second $TranCongestion$, $BW_{old}$) when the value of $TranCongestion$ is set to a second $TranCongestion$, and the first $BW_{new}>$the second $BW_{new}$ if the first $TranCongestion<$the second $TranCongestion$.

With reference to the fourth implementation manner of the first aspect, in an eleventh implementation manner of the first aspect, determining the transmission bandwidth according to the high-level congestion status parameter includes acquiring a quantity of continuous up-regulations of the transmission bandwidth of the transmission link if a high-level congestion status of the transmission link is determined to be non-congested according to the high-level congestion status parameter, and determining a transmission bandwidth adjustment factor of the transmission link according to the quantity of continuous up-regulations of the transmission bandwidth and a first calculation function $\beta=1+f_4(m)$ of the transmission bandwidth adjustment factor, where m is the quantity of continuous up-regulations of the transmission bandwidth, $\beta$ is the transmission bandwidth adjustment factor of the transmission link, and the function $f_4$ meets conditions, a first $\beta=1+f_4$(the first m) when a value of m is set to a first m, a second $\beta=1+f_4$(the second m) when the value of m is set to a second m, and the first $\beta$<the second $\beta$ if the first m<the second m, or acquiring a quantity of continuous down-regulations of the transmission bandwidth of the transmission link if a high-level congestion status of the transmission link is determined to be congested according to the high-level congestion status parameter, and determining a transmission bandwidth adjustment factor of the transmission link according to the quantity of continuous down-regulations and a second calculation function $\beta=1-f_5(n)$ of the transmission bandwidth adjustment factor, where n is the quantity of continuous down-regulations of the transmission bandwidth, $\beta$ is the transmission bandwidth adjustment factor of the transmission link, and $f_5$ meets conditions, a third $\beta=1-f_5$(the first n) when a value of n is set to a first n, a fourth $\beta=1-f_5$(the second n) when the value of n is set to a second n, and the third $\beta$<the fourth $\beta$, and $f_5(n)<1$ if the first n<the second n, and acquiring a current transmission bandwidth $BW_{old}$ of the transmission link, and determining the transmission bandwidth $BW_{new}$ according to the current transmission bandwidth $BW_{old}$, the transmission bandwidth adjustment factor $\beta$ of the transmission link, and a transmission bandwidth calculation formula $BW_{new}=\beta \times BW_{old}$.

With reference to the first aspect or any of the foregoing implementation manners of the first aspect, in a twelfth implementation manner of the first aspect, the method further includes determining the primary congestion status according to data packet sending information of the transmit end and data packet receiving information of the receive end, or determining the primary congestion status according to a comparison result between the acquired transmission delay and an average transmission delay of the transmission link within a preset time period.

A second aspect of the present disclosure provides a device for determining a transmission buffer size, where the device includes an acquiring unit configured to acquire a transmission delay of a data packet that is sent by a transmit end on a transmission link between the transmit end and a receive end, a minimum delay updating unit configured to update a minimum transmission delay according to the transmission delay acquired by the acquiring unit and based on a first update period if a primary congestion status of the transmission link is congested, and update the minimum transmission delay according to the transmission delay and based on a second update period if the primary congestion status is non-congested, where a period length of the first update period is shorter than a period length of the second update period, and a buffer size determining unit configured to obtain a minimum transmission delay of the transmission link, and determine, according to the transmission delay acquired by the acquiring unit and the minimum transmission delay obtained by the minimum delay updating unit, a transmission buffer size of the transmission link.

With reference to the second aspect, in a first implementation manner of the second aspect, the buffer size determining unit includes a dejittering unit and a first buffer size determining unit, or a second buffer size determining unit, where the dejittering unit is configured to perform dejittering processing on the transmission delay to obtain an anti-interference transmission delay of the transmission link. The first buffer size determining unit is configured to use a difference between the anti-interference transmission delay obtained by the dejittering unit and the minimum transmission delay as the transmission buffer size, and the second buffer size determining unit is configured to calculate a difference between the transmission delay acquired by the acquiring unit and the minimum transmission delay obtained by the minimum delay updating unit, and use the difference as the transmission buffer size.

With reference to the first implementation manner of the second aspect, in a second implementation manner of the second aspect, the dejittering unit is further configured to obtain the anti-interference transmission delay of the transmission link according to an anti-interference transmission delay calculation function $T_{delay}=f_1(T)$ and the transmission delay, where $T_{delay}$ is the anti-interference transmission delay, T is the transmission delay, and $f_1$ is a low-pass filtering function.

With reference to the second aspect or any of the foregoing implementation manners of the second aspect, in a third implementation manner of the second aspect, the device further includes one of a bandwidth determining unit, a bandwidth variation determining unit, and a congestion status parameter determining unit, where the bandwidth determining unit is configured to determine a transmission bandwidth of the transmit end on the transmission link according to the transmission buffer size. The bandwidth variation determining unit is configured to determine a transmission bandwidth variation on the transmission link according to the transmission buffer size, and the congestion status parameter determining unit is configured to determine a high-level congestion status parameter of the transmission link according to the transmission buffer size, where the high-level congestion status parameter is used to indicate a congestion level of the transmission link.

With reference to the third implementation manner of the second aspect, in a fourth implementation manner of the second aspect, the bandwidth determining unit includes a congestion status parameter determining unit and a first bandwidth determining unit, or a second bandwidth determining unit, where the congestion status parameter determining unit is configured to determine the high-level congestion status parameter of the transmission link according to the transmission buffer size. The first bandwidth determining unit is configured to determine the transmission bandwidth according to the high-level congestion status parameter determined by the congestion status parameter determining unit, and the second bandwidth determining unit is configured to determine the transmission bandwidth according to a correspondence between the transmission buffer size and the transmission bandwidth and a correspondence between a preset transmission buffer size and the transmission bandwidth.

With reference to the third or fourth implementation manner of the second aspect, in a fifth implementation manner of the second aspect, the congestion status parameter determining unit is further configured to determine the high-level congestion status parameter of the transmission link according to a value relationship between the transmission buffer size and preset buffer size thresholds, where the preset buffer size thresholds include at least two thresholds.

With reference to the fifth implementation manner of the second aspect, in a sixth implementation manner of the second aspect, the preset buffer size thresholds are MemLengthTd$_1$, MemLengthTd$_1$MemLengthTd$_2$, . . . , and MemLengthTd$_N$, N is an integer greater than 2, and MemLengthTd$_1$<MemLengthTd$_2$<, . . . , <MemLengthTd$_N$. The high-level congestion status parameter of the transmission link is TranCongestion$_i$, a value of i is set to 1, . . . , N, and N+1 respectively, and a congestion level indicated by TranCongestion$_{i+1}$ is severer than a congestion level indicated by TranCongestion$_i$, and the congestion status parameter determining unit is further configured to determine that the high-level congestion status parameter of the transmission link is TranCongestion$_{j+1}$ when the transmission buffer size is greater than MemLengthTd$_j$ and the transmission buffer size is less than or equal to MemLengthTd$_{j+1}$, where 1≤j<N, and j is an integer, or determine that the high-level congestion status parameter of the transmission link is TranCongestion$_1$ when the transmission buffer size is greater than or equal to 0 and the transmission buffer size is less than or equal to MemLengthTd$_1$, or determine that the high-level congestion status parameter of the transmission link is TranCongestion$_{N+1}$ when the transmission buffer size is greater than MemLengthTd$_N$.

With reference to the third or fourth implementation manner of the second aspect, in a seventh implementation manner of the second aspect, the congestion status parameter determining unit is further configured to determine a transmission buffer size variable of the transmission link according to the transmission buffer size and a previous transmission buffer size neighboring to the transmission buffer size, and determine the high-level congestion status parameter of the transmission link according to the transmission buffer size, the transmission buffer size variable, and a relationship among a preset transmission buffer size, the transmission buffer size variable, and the high-level congestion status parameter.

With reference to the seventh implementation manner of the second aspect, in an eighth implementation manner of the second aspect, the relationship among the preset transmission buffer size, the transmission buffer size variable, and the high-level congestion status parameter is TranCongestion=f$_2$(ΔMemLength, MemLength), where TranCongestion is the high-level congestion status parameter of the transmission link, and a larger value of TranCongestion indicates a severer congestion level of the transmission link, ΔMemLength is the transmission buffer size variable, MemLength is the transmission buffer size, and the function f$_2$ meets conditions (a), (b) and (c), where the conditions (a), (b) and (c) are as follows.

(a) In a case in which a value of MemLength is set to X, and X is any non-negative number, a first TranCongestion=f$_2$(the first ΔMemLength, X) when a value of ΔMemLength is set to a first ΔMemLength, a second TranCongestion=f$_2$(the second ΔMemLength, X) when the value of ΔMemLength is set to a second ΔMemLength, and the first TranCongestion<the second TranCongestion if the first ΔMemLength<the second ΔMemLength;

(b) In a case in which the value of ΔMemLength is set to Y, and Y is an arbitrary number, a third TranCongestion=f$_2$(Y, the first MemLength) when the value of MemLength is set to a first MemLength, a fourth TranCongestion=f$_2$(Y, the second MemLength) when the value of MemLength is set to a second MemLength, and the third TranCongestion<the fourth TranCongestion if the first MemLength<the second MemLength; and (c) A fifth TranCongestion=f$_2$(the third ΔMemLength, the third MemLength) when the value of MemLength is set to a third MemLength, and the value of ΔMemLength is set to a third ΔMemLength, and a sixth TranCongestion=f$_2$(the fourth ΔMemLength, the fourth MemLength) when the value of MemLength is set to a fourth MemLength, and the value of ΔMemLength is set to a fourth ΔMemLength, where the fifth TranCongestion<the sixth TranCongestion if the third MemLength<the fourth MemLength, and the third ΔMemLength/the third MemLength=the fourth ΔMemLength/the fourth MemLength>0, or the fifth TranCongestion>the sixth TranCongestion if the third MemLength<the fourth MemLength, and the third ΔMemLength/the third MemLength=the fourth ΔMemLength/the fourth MemLength<0.

With reference to the eighth implementation manner of the second aspect, in a ninth implementation manner of the second aspect, the first bandwidth determining unit is further configured to determine that the transmission bandwidth of the transmission link is a first transmission bandwidth according to a correspondence between the first high-level congestion status parameter and the transmission bandwidth and a correspondence between a preset high-level congestion status parameter and the transmission bandwidth if the high-level congestion status parameter determined by the congestion status parameter determining unit is a first high-level congestion status parameter, and determine that the transmission bandwidth of the transmission link is a second transmission bandwidth according to a correspondence between the second high-level congestion status parameter and the transmission bandwidth and the correspondence between the preset high-level congestion status parameter and the transmission bandwidth if the high-level congestion status parameter determined by the congestion status parameter determining unit is a second high-level congestion status parameter, where the correspondence between the preset high-level congestion status parameter and the transmission bandwidth meets conditions, the first transmission bandwidth is less than the second transmission bandwidth if the first high-level congestion status parameter is greater than the second high-level congestion status parameter, the first transmission bandwidth is greater than the second transmission bandwidth if the first high-level congestion status parameter is less than the second high-level congestion status parameter, and the first transmission bandwidth is equal to the second transmission bandwidth if the first high-level congestion status parameter is equal to the second high-level congestion status parameter.

With reference to the fourth implementation manner of the second aspect, in a tenth implementation manner of the second aspect, the first bandwidth determining unit is further configured to acquire a current transmission bandwidth BW$_{old}$ of the transmission link, and determine the transmission bandwidth according to the high-level congestion status parameter, BW$_{old}$, and a transmission bandwidth function BW$_{new}$=f$_3$(TranCongestion, BW$_{old}$), where TranCongestion is the high-level congestion status parameter, BW$_{new}$ is the transmission bandwidth, and a larger value of TranCongestion indicates a severer congestion level of the transmission link, where the function f$_3$ meets conditions, a first BW$_{new}$=f$_3$(the first TranCongestion, BW$_{old}$) when a value of TranCongestion is set to a first TranCongestion, a second BW$_{new}$=f$_3$(the second TranCongestion, BW$_{old}$) when the value of TranCongestion is set to a second TranCongestion, and the first BW$_{new}$>the second BW$_{new}$ if the first TranCongestion<the second TranCongestion.

With reference to the fourth implementation manner of the second aspect, in an eleventh implementation manner of the second aspect, the first bandwidth determining unit is further configured to acquire a quantity of continuous up-regulations of the transmission bandwidth of the transmission link if a high-level congestion status of the transmission link is determined to be non-congested according to the high-level congestion status parameter determined by the congestion status parameter determining unit, and determine a transmission bandwidth adjustment factor of the transmission link according to the quantity of continuous up-regulations of the transmission bandwidth and a first calculation function $\beta=1+f_4(m)$ of the transmission bandwidth adjustment factor, where m is the quantity of continuous up-regulations of the transmission bandwidth, $\beta$ is the transmission bandwidth adjustment factor of the transmission link, and the function $f_4$ meets conditions a first $\beta=1+f_4$(the first m) when a value of m is set to a first m, a second $\beta=1+f_4$(the second m) when the value of m is set to a second m, and the first $\beta<$the second $\beta$ if the first m<the second m, or acquire a quantity of continuous down-regulations of the transmission bandwidth of the transmission link if a high-level congestion status of the transmission link is determined to be congested according to the high-level congestion status parameter determined by the congestion status parameter determining unit, and determine a transmission bandwidth adjustment factor of the transmission link according to the quantity of continuous down-regulations and a second calculation function $\beta=1-f_5(n)$ of the transmission bandwidth adjustment factor, where n is the quantity of continuous down-regulations of the transmission bandwidth, $\beta$ is the transmission bandwidth adjustment factor of the transmission link, and $f_5$ meets conditions, a third $\beta=1-f_5$(the first n) when a value of n is set to a first n, a fourth $\beta=1-f_5$(the second n) when a value of the quantity n of continuous down-regulations of the transmission bandwidth is set to a second n, and the third $\beta<$the fourth $\beta$, and $f_5(n)<1$ if the first n<the second n, acquire a current transmission bandwidth $BW_{old}$ of the transmission link, and determine the transmission bandwidth $BW_{new}$ according to the current transmission bandwidth $BW_{old}$, the transmission bandwidth adjustment factor $\beta$ of the transmission link, and a transmission bandwidth calculation formula $BW_{new}=\beta \times BW_{old}$.

With reference to the second aspect or any of the foregoing implementation manners of the second aspect, in a twelfth implementation manner of the second aspect, the device further includes a primary congestion status determining unit, where the primary congestion status determining unit is further configured to determine the primary congestion status according to data packet sending information of the transmit end and data packet receiving information of the receive end, or determine the primary congestion status according to a comparison result between the transmission delay acquired by the acquiring unit and an average transmission delay of the transmission link within a preset time period.

As can be seen from the foregoing technical solutions, according to the method for determining a transmission buffer size in the embodiments of the present disclosure, update a minimum transmission delay is performed according to a primary congestion status of a transmission link such that when the primary congestion status is congested, an abnormally high point, appearing in a transmission process, of the transmission buffer size can be removed or smoothened in a timely manner, and the minimum transmission delay of the transmission link is more accurate, thereby making the transmission buffer size of the transmission link more accurate to better reflect a current congestion status of the transmission link.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a transmit end and a receive end mentioned in the embodiments of the present disclosure may be two devices between which there is information transmission, and may also be two modules, between which there is information transmission, inside a same device, which is not limited herein. For example, the transmit end and the receive end may be a network side device and a user equipment, or two modules, between which there is information transmission, in a user equipment or a network side device. The transmit end and the receive end may be determined according to a sending direction of a data packet, which is not limited. Additionally, a method provided in the embodiments of the present disclosure may be executed by the transmit end or the receive end, or may be executed by an independent device, which is not limited.

Figure 1:
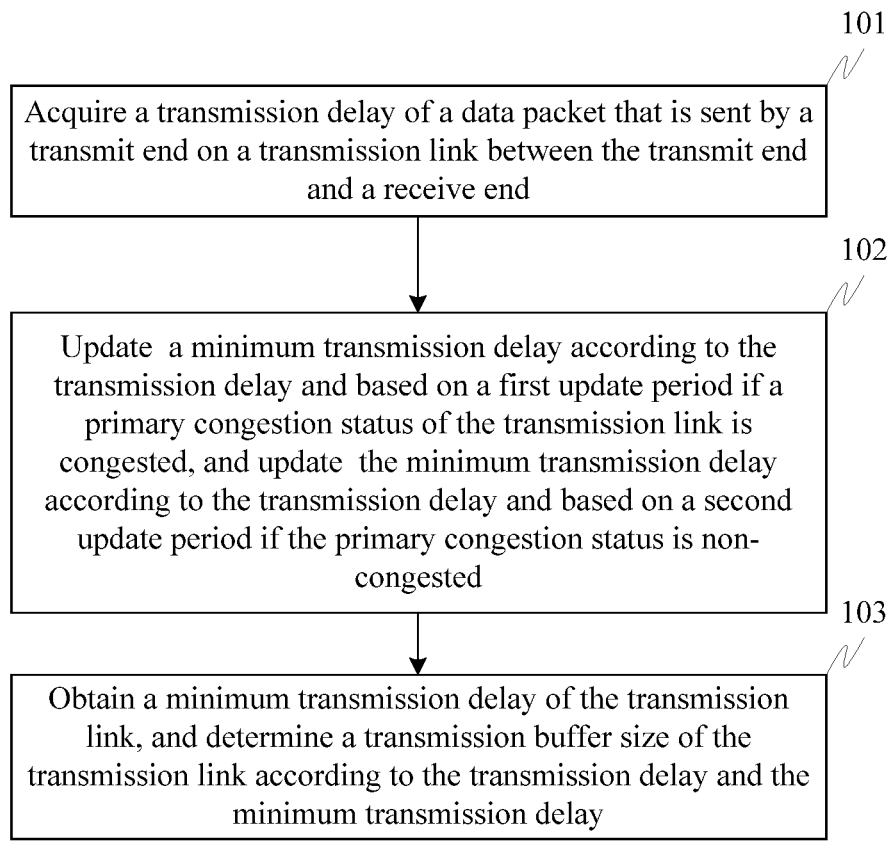
FIG. 1 is a flowchart of a method for determining a transmission buffer size according to an embodiment of the present disclosure.

As shown in FIG. 1, an embodiment of the present disclosure provides a method for determining a transmission buffer size. Details are as follows.

Step 101: Acquire a transmission delay of a data packet that is sent by a transmit end on a transmission link between the transmit end and a receive end.

The transmission delay refers to a transmission time of a data packet between a transmit end and a receive end, namely, a time interval from the time when the transmit end starts to send the data packet to the time when the receive end receives the data packet completely.

The transmission link may be an air-interface transmission link, such as a traffic channel, or may be an actual physical connection link, such as an optical fiber, which is not limited herein.

Step 102: Update a minimum transmission delay according to the transmission delay and based on a first update period if a primary congestion status of the transmission link is congested, and update the minimum transmission delay according to the transmission delay and based on a second update period if the primary congestion status is non-congested.

The primary congestion status may be determined according to data packet sending information of the transmit end and data packet receiving information of the receive end, for example, a sending moment of the data packet and a receiving moment of the data packet, and for another example, a quantity of sent data packets and a quantity of received data packets such that the primary congestion status is further determined according to the transmission delay and/or a LPR, which belongs to the prior art and is not detailed any further.

It should be noted that the minimum transmission delay may be a minimum value of the transmission delay on the transmission link within a preset time period and is used to reflect, in real time, a status of the transmission link within the preset time period.

A period length of the first update period is shorter than a period length of the second update period, to ensure that an update frequency of the minimum transmission delay in a congested state is greater than an update frequency of the minimum transmission delay in a non-congested state such that the minimum transmission delay is updated in a timely manner to reflect a status of the transmission link in real time when the primary congestion status of the transmission link is congested, and calculations in an execution body can be reduced and a large fluctuation of the minimum transmission delay can also be avoided when the primary congestion status is non-congested. Additionally, the second update period may also be an infinite time period, that is, the update of the minimum transmission delay may be not performed in a non-congested state. Period lengths of the first update period and the second update period may be determined by simulation or by experience, and may be set using an external input device, or may be directly set in the execution body of the embodiment. Implementation of the period lengths of the first update period and the second update period may be triggered by an event or a timer, which is not limited.

In step 102, a processing process of the minimum transmission delay may include determining whether the transmission delay in step 101 is shorter than the minimum transmission delay within a preset time period, and updating the minimum transmission delay within the preset time period to the transmission delay in step 101 if yes, and calculating an intermediate value between the transmission delay in step 101 and the minimum transmission delay within the preset time period, and updating the minimum transmission delay within the preset time period to the intermediate value, or skipping any processing if not.

The preset time period may be set by simulation or by experience, and further, may be set using an external input device, or may be directly set in the execution body of this embodiment, which is not limited herein.

Step 103: Obtain the minimum transmission delay of the transmission link, and determine a transmission buffer size of the transmission link according to the transmission delay and the minimum transmission delay.

The transmission buffer size is used to indicate a total amount of data buffered on a current transmission link and may be used to represent a congestion status on the transmission link. For example, a larger value of the transmission buffer size of the transmission link indicates a severer congestion level of the transmission link, or a greater increment of the transmission buffer size indicates a severer congestion level of the transmission link, or a greater increment of the transmission buffer size indicates a severer congestion level of the transmission link when the transmission buffer size is relatively large, which is not limited herein.

Further, in step 103, the transmission buffer size may be determined in the following two manners.

Manner 1: Performing dejittering processing on the transmission delay to obtain an anti-interference transmission delay of the transmission link, and using a difference between the anti-interference transmission delay and the minimum transmission delay as the transmission buffer size.

Manner 2: Calculating a difference between the transmission delay and the minimum transmission delay, and using the difference as the transmission buffer size.

In Manner 1, performing dejittering processing on the transmission delay to obtain an anti-interference transmission delay of the transmission link may include obtaining the anti-interference transmission delay of the transmission link according to an anti-interference transmission delay calculation function $T_{delay}=f_1(T)$ and the transmission delay, where $T_{delay}$ is the anti-interference transmission delay, T is the transmission delay, and $f_1$ is a low-pass filtering function.

According to the method for determining a transmission buffer size in this embodiment of the present disclosure, update a minimum transmission delay is performed according to a primary congestion status of a transmission link such that when the primary congestion status of the transmission link is congested, an abnormally high point, appearing in a transmission process, of the transmission buffer size can be removed or smoothened in a timely manner, and the minimum transmission delay of the transmission link is more timely and accurate, thereby making the transmission buffer size of the transmission link more accurate to better reflect a current status of the transmission link.

Optionally, in a first application scenario of the foregoing embodiment, step 104*a* (not shown) is further included after step 103, as described below.

Step 104*a*: Determine a high-level congestion status parameter of the transmission link according to the transmission buffer size, where the high-level congestion status parameter is used to indicate a congestion level of the transmission link.

In a first implementation manner, step 104*a* may include determining the high-level congestion status parameter of the transmission link according to a value relationship between the transmission buffer size and preset buffer size thresholds.

The preset buffer size thresholds include at least two thresholds, and may be set using an external input device, or may be directly set in the execution body of this embodiment of the present disclosure.

The following example is used for description.

Assuming that a quantity of the preset buffer size thresholds is N, where N is an integer greater than 2, the N preset buffer size thresholds are $MemLengthTd_1$, $MemLengthTd_2$, ..., and $MemLengthTd_N$, and $MemLengthTd_1 < MemLengthTd_2 < , ..., < MemLengthTd_N$. The high-level congestion status parameter of the transmission link is $TranCongestion_i$, a value of i is set to 1, ..., N, and N+1 respectively, and a congestion level indicated by $TranCongestion_{i+1}$ is severer than a congestion level indicated by $TranCongestion_i$, determine that the high-level congestion status parameter of the transmission link is $TranCongestion_{j+1}$ when the transmission buffer size is greater than $MemLengthTd_j$ and the transmission buffer size is less than or equal to $MemLengthTd_{j+1}$, where $1 \leq j < N$, and j is an integer, or determine that the high-level congestion status parameter of the transmission link is $TranCongestion_1$ when the transmission buffer size is greater than or equal to 0 and the transmission buffer size is less than or equal to $MemLengthTd_1$, or determine that the high-level congestion status parameter of the transmission link is $TranCongestion_{N+1}$ when the transmission buffer size is greater than $MemLengthTd_N$.

The relationship among the transmission buffer size, the buffer size threshold, and the high-level congestion status parameter is shown in Table 1.

TABLE 1

| Value relationship between a transmission buffer size and a buffer size threshold | Congestion status |
|---|---|
| Transmission buffer size $\in [0, MemLengthTd_1]$ | $TranCongestion_1$ |
| ... | ... |
| Transmission buffer size $\in (MemLengthTd_j, MemLengthTd_{j+1}]$ | $TranCongestion_{j+1}$ |
| ... | ... |
| Transmission buffer size $\in (MemLengthTd_{N-1}, MemLengthTd_N]$ | $TranCongestion_N$ |
| Transmission buffer size $\in (MemLengthTd_N, \infty)$ | $TranCongestion_{N+1}$ |

In a second implementation manner, step 104a may include determining a transmission buffer size variable of the transmission link according to the transmission buffer size and a previous transmission buffer size neighboring to the transmission buffer size, and determining the high-level congestion status parameter of the transmission link according to the transmission buffer size, the transmission buffer size variable, and a relationship among a preset transmission buffer size, the transmission buffer size variable, and the high-level congestion status parameter.

The relationship among the preset transmission buffer size, the transmission buffer size variable, and the high-level congestion status parameter may be a function $TranCongestion = f_2(\Delta MemLength, MemLength)$.

It should be noted that, in the foregoing relationship, TranCongestion is the high-level congestion status parameter of the transmission link, and a larger value of TranCongestion indicates a severer congestion level of the transmission link, $\Delta MemLength$ is the transmission buffer size variable, MemLength is the transmission buffer size, and the function $f_2$ meets conditions (a), (b) and (c), where the conditions (a), (b) and (c) are as follows.

(a) In a case in which a value of MemLength is set to X, and X is any non-negative number, a first $TranCongestion = f_2$(the first $\Delta MemLength$, X) when a value of $\Delta MemLength$ is set to a first $\Delta MemLength$, a second $TranCongestion = f_2$(the second $\Delta MemLength$, X) when the value of $\Delta MemLength$ is set to a second $\Delta MemLength$, and the first TranCongestion<the second TranCongestion if the first $\Delta MemLength$<the second $\Delta MemLength$;

(b) In a case in which the value of $\Delta MemLength$ is set to Y, and Y is an arbitrary number, a third $TranCongestion = f_2$(Y, the first MemLength) when the value of MemLength is set to a first MemLength, a fourth $TranCongestion = f_2$(Y, the second MemLength) when the value of MemLength is set to a second MemLength, and the third TranCongestion<the fourth TranCongestion if the first MemLength<the second MemLength; and (c) A fifth $TranCongestion = f_2$(the third $\Delta MemLength$, the third MemLength) when the value of MemLength is set to a third MemLength, and the value of $\Delta MemLength$ is set to a third $\Delta MemLength$, and a sixth $TranCongestion = f_2$(the fourth $\Delta MemLength$, the fourth MemLength) when the value of MemLength is set to a fourth MemLength, and the value of $\Delta MemLength$ is set to a fourth $\Delta MemLength$, where the fifth TranCongestion<the sixth TranCongestion if the third MemLength<the fourth MemLength, and the third $\Delta MemLength$/the third MemLength=the fourth $\Delta MemLength$/the fourth MemLength$\geq$0, or the fifth TranCongestion>the sixth TranCongestion if the third MemLength<the fourth MemLength, and the third $\Delta MemLength$/the third MemLength=the fourth $\Delta MemLength$/the fourth MemLength<0.

For example, the function $f_2$ may further be $TranCongestion = a + b*MemLength - \Delta MemLength*c$, where a, b, and c may be set by simulation and may vary with a value change of MemLength.

In the second implementation manner, the high-level congestion status parameter is determined according to the transmission buffer size and the transmission buffer size variation, which takes both a current transmission buffer size and a variation condition of the transmission buffer size into account, thereby improving congestion detection accuracy.

It should be noted that in the first application scenario of the foregoing embodiment, based on a basic congestion detection, the high-level congestion status parameter of the transmission link is determined according to the transmission buffer size of the transmission link, which greatly improves congestion detection accuracy and provides a reliable support for flow control of the transmission link.

Optionally, in a second application scenario of the foregoing embodiment, step 104b (not shown) may further be included after step 103, as described below.

Step 104b: Determine a transmission bandwidth variation on the transmission link according to the transmission buffer size.

In step 104b, the transmission bandwidth variation on the transmission link may be determined using a correspondence between a preset transmission buffer size and the transmission bandwidth variation. The correspondence may be in a form of a function, or may be in a form of a table, which is not repeated herein.

For example, the transmission bandwidth variation $\Delta BW$ of the transmission link=$-\mu \times$transmission buffer size, where $\mu$ may be set by simulation or by experience.

It should be noted that the transmission bandwidth variation is used to adjust the transmission bandwidth of the transmit end on the transmission link.

In the second application scenario of the foregoing embodiment, the transmission bandwidth variation is determined according to the transmission buffer size in order to adjust the transmission bandwidth of the transmit end on the transmission link such that more timely and accurate flow control can be implemented on data sent on the transmission link, thereby improving transmission reliability.

Optionally, in a third application scenario of the foregoing embodiment, step 104*c* (not shown) may further be included after step 103, as described below.

Step 104*c*: Determine a transmission bandwidth of the transmit end on the transmission link according to the transmission buffer size.

Step 104*c* may be implemented in the following Manner 1 and Manner 2.

Manner 1: Determining a high-level congestion status parameter of the transmission link according to the transmission buffer size, and determining the transmission bandwidth according to the high-level congestion status parameter.

The high-level congestion status parameter is used to indicate a congestion level of the transmission link. Additionally, determining a high-level congestion status parameter of the transmission link according to the transmission buffer size may be implemented in the first implementation manner and the second implementation manner in step 104*a*, which is not repeated herein.

Manner 2: Determining the transmission bandwidth according to a correspondence between the transmission buffer size and the transmission bandwidth and a correspondence between a preset transmission buffer size and the transmission bandwidth.

The correspondence between the preset transmission buffer size and the transmission bandwidth may be represented in a table. Transmission buffer sizes of different ranges correspond to different transmission bandwidths, where a greater transmission buffer size corresponds to a smaller transmission bandwidth. The correspondence between the preset transmission buffer size and the transmission bandwidth may also be represented by a function, which is not repeated herein.

It should be noted that in Manner 1, determining the transmission bandwidth according to the high-level congestion status parameter may further be implemented in Manner a, Manner b, or Manner c.

Manner a: Acquiring a current transmission bandwidth $BW_{old}$ of the transmission link, and determining the transmission bandwidth according to the high-level congestion status parameter, $BW_{old}$, and a transmission bandwidth function $BW_{new}=f_3(\text{TranCongestion}, BW_{old})$, where TranCongestion is the high-level congestion status parameter, $BW_{new}$ is the transmission bandwidth, and a larger value of TranCongestion indicates a severer congestion level of the transmission link, where the function $f_3$ meets conditions, a first $BW_{new}=f_3(\text{the first TranCongestion}, BW_{old})$ when a value of TranCongestion is set to a first TranCongestion, a second $BW_{new}=f_3(\text{the second TranCongestion}, BW_{old})$ when the value of TranCongestion is set to a second TranCongestion, and the first $BW_{new}>$the second $BW_{new}$ if the first TranCongestion<the second TranCongestion.

The function $f_3$ may be a decreasing function, for example $f_3(\text{TranCongestion}, BW_{old})=BW_{old}-0.03\times\text{TranCongestion}$.

Manner b: Acquiring a quantity of continuous up-regulations of the transmission bandwidth of the transmission link if a high-level congestion status of the transmission link is determined to be non-congested according to the high-level congestion status parameter, and determining a transmission bandwidth adjustment factor of the transmission link according to the quantity of continuous up-regulations of the transmission bandwidth and a first calculation function $\beta=1+f_4(m)$ of the transmission bandwidth adjustment factor, where m is the quantity of continuous up-regulations of the transmission bandwidth, $\beta$ is the transmission bandwidth adjustment factor of the transmission link, and the function $f_4$ meets conditions, a first $\beta=1+f_4(\text{the first m})$ when a value of m is set to a first m, a second $\beta=1+f_4(\text{the second m})$ when the value of m is set to a second m, and the first $\beta<$the second $\beta$ if the first m<the second m, or acquiring a quantity of continuous down-regulations of the transmission bandwidth of the transmission link if a high-level congestion status of the transmission link is determined to be congested according to the high-level congestion status parameter, and determining a transmission bandwidth adjustment factor of the transmission link according to the quantity of continuous down-regulations and a second calculation function $\beta=1-f_5(n)$ of the transmission bandwidth adjustment factor, where n is the quantity of continuous down-regulations of the transmission bandwidth, $\beta$ is the transmission bandwidth adjustment factor of the transmission link, and $f_5$ meets conditions a third $\beta=1-f_5(\text{the first n})$ when a value of the quantity n of continuous down-regulations of the transmission bandwidth is set to a first n, a fourth $\beta=1-f_5(\text{the second n})$ when the value of n is set to a second n, and the third $\beta<$the fourth $\beta$, and $f_5(n)<1$ if the first n<the second n, acquiring a current transmission bandwidth $BW_{old}$ of the transmission link, and determining the transmission bandwidth $BW_{new}$ according to the current transmission bandwidth $BW_{old}$, the transmission bandwidth adjustment factor $\beta$ of the transmission link, and a transmission bandwidth calculation formula $BW_{new}=\beta\times BW_{old}$.

The functions $f_4(m)$ and $f_5(n)$ may be set by experience or by simulation. For example, the function $f_4(m)=0.01\,m^2$, the function $f_5(n)=0.02n$. Additionally, m is set to 0 if the transmission bandwidth on the transmission link is down-regulated, and n is set to 0 if the transmission bandwidth on the transmission link is up-regulated.

It should be noted that determining a high-level congestion status of the transmission link according to the high-level congestion status parameter may further be implemented by means of comparison with a preset threshold, which is not repeated herein.

Manner c: Determining that the transmission bandwidth of the transmission link is a first transmission bandwidth according to a correspondence between the first high-level congestion status parameter and the transmission bandwidth and a correspondence between a preset high-level congestion status parameter and the transmission bandwidth if the high-level congestion status parameter is a first high-level congestion status parameter, and determining that the transmission bandwidth of the transmission link is a second transmission bandwidth according to a correspondence between the second high-level congestion status parameter and the transmission bandwidth and the correspondence between the preset high-level congestion status parameter and the transmission bandwidth if the high-level congestion status parameter is a second high-level congestion status parameter, where the correspondence between the preset high-level congestion status parameter and the transmission bandwidth meets conditions, the first transmission bandwidth is less than the second transmission bandwidth if the first high-level congestion status parameter is greater than the second high-level congestion status parameter, the first transmission bandwidth is greater than the second transmission bandwidth if the first high-level congestion status parameter is less than the second high-level congestion status parameter, and the first transmission bandwidth is equal to the second transmission bandwidth if the first high-level congestion status parameter is equal to the second high-level congestion status parameter.

The foregoing high-level congestion status parameter may indicate different congestion statuses. Obviously, the high-level congestion status parameter may be converted to different high-level congestion statuses, and then the transmission bandwidth may be determined according to the correspondence between the preset high-level congestion status parameter and the transmission bandwidth, which is not repeated herein.

It should be noted that in the third application scenario of the foregoing embodiment, the transmission bandwidth is determined according to the transmission buffer size such that more timely and accurate flow control can be implemented on data sent on the transmission link, thereby improving transmission reliability.

Optionally, in a fourth application scenario of the foregoing embodiment, step 100 (not shown) may further be included before step 101, as described below.

Step 100: Determine the primary congestion status according to data packet sending information of the transmit end and data packet receiving information of the receive end.

The data packet sending information of the transmit end is used to indicate a data packet sending status of the transmit end, and the data packet receiving information of the receive end is used to indicate a data packet receiving status of the receive end. For example, the data packet sending information of the transmit end may be a moment at which the transmit end sends the data packet, and the data packet receiving information of the receive end may be a moment at which the receive end receives the data packet correctly, or, the data packet sending information of the transmit end may be a quantity of data packets sent by the transmit end, and the data packet receiving information of the receive end may be a quantity of data packets received by the receive end correctly.

For example, the transmission delay of the data packet is obtained when the data packet sending information includes the moment at which the transmit end sends the data packet, and the data packet receiving information of the receive end includes the moment at which the receive end receives the data packet correctly. It is determined that the primary congestion status of the transmission link is congested, if the obtained transmission delay of the data packet is greater than the preset threshold. Otherwise, it is determined that the primary congestion status of the transmission link is non-congested.

Optionally, in a fifth application scenario of the foregoing embodiment, step 101a (not shown) may further be included after step 101, as described below.

Step 101a: Determine the primary congestion status according to a comparison result between the acquired transmission delay and an average transmission delay of the transmission link within a preset time period.

The primary congestion status may be determined directly according to the transmission delay that is acquired in step 101. Further, the primary congestion status is determined according to a comparison result between the transmission delay in step 101 and an average transmission delay of the transmission link within a preset time period. For example, it is determined that the primary congestion status is congested if the transmission delay in step 101 is greater than the average transmission delay, otherwise, it is determined that the primary congestion status is non-congested.

It should be noted that the methods provided by all embodiments of the present disclosure can be executed based on congestion detection in other approaches, and a result of the congestion detection in other approaches is used as the basic congestion detection status, which can improve congestion detection accuracy. Additionally, all embodiments of the present disclosure can be executed by the transmit end, or the receive end, or a device other than the transmit end and the receive end, which is not limited herein.

Figure 2:
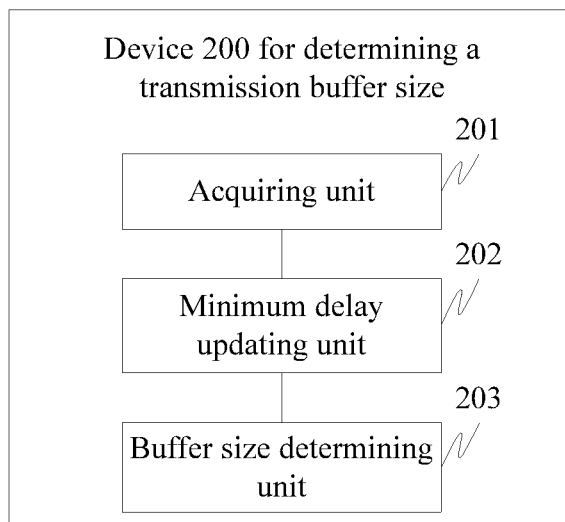
FIG. 2 is a schematic diagram of a device for determining a transmission buffer size according to an embodiment of the present disclosure.

As shown in FIG. 2, a device 200 for determining a transmission buffer size provided by an embodiment of the present disclosure may be used to execute the method shown in FIG. 1. The device 200 includes an acquiring unit 201, a minimum delay updating unit 202, and a buffer size determining unit 203.

The acquiring unit 201 is configured to acquire a transmission delay of a data packet that is sent by a transmit end on a transmission link between the transmit end and a receive end.

The minimum delay updating unit 202 is configured to update a minimum transmission delay according to the transmission delay acquired by the acquiring unit 201 and based on a first update period if a primary congestion status of the transmission link is congested, and update the minimum transmission delay according to the transmission delay acquired by the acquiring unit 201 and based on a second update period if the primary congestion status is non-congested, where a period length of the first update period is shorter than a period length of the second update period.

For the first update period and the second update period, reference may be made to related descriptions of step 102. The second update period may also be an infinite time period, that is, the update of the minimum transmission delay may be not performed in a non-congested state. Period lengths of the first update period and the second update period may be determined by simulation or by experience such that the minimum transmission delay can be updated in a more timely manner when the primary congestion status is congested. Implementation of the period lengths of the first update period and the second update period may be triggered by an event or a timer, which is not limited.

In step 102, a processing process of the minimum transmission delay may include determining whether the transmission delay in step is shorter than the minimum transmission delay within a preset time period, updating the minimum transmission delay within the preset time period to the transmission delay if yes, calculating an intermediate value between the transmission delay and the minimum transmission delay within the preset time period, and updating the minimum transmission delay within the preset time period to the intermediate value, or, skipping any processing if not. The minimum transmission delay may be a minimum value of the transmission delay on the transmission link within the preset time period, and is used to reflect, in real time, a status of the transmission link within the preset time period.

The preset time period may be set by simulation or by experience, and further, may be set using an external input device, or may be directly set in the execution body of this embodiment, which is not limited herein.

The buffer size determining unit 203 is configured to acquire a minimum transmission delay of the transmission link, and determine a transmission buffer size of the transmission link according to the transmission delay acquired by the acquiring unit 201 and the minimum transmission delay acquired by the minimum delay updating unit 202.

Figure 3:
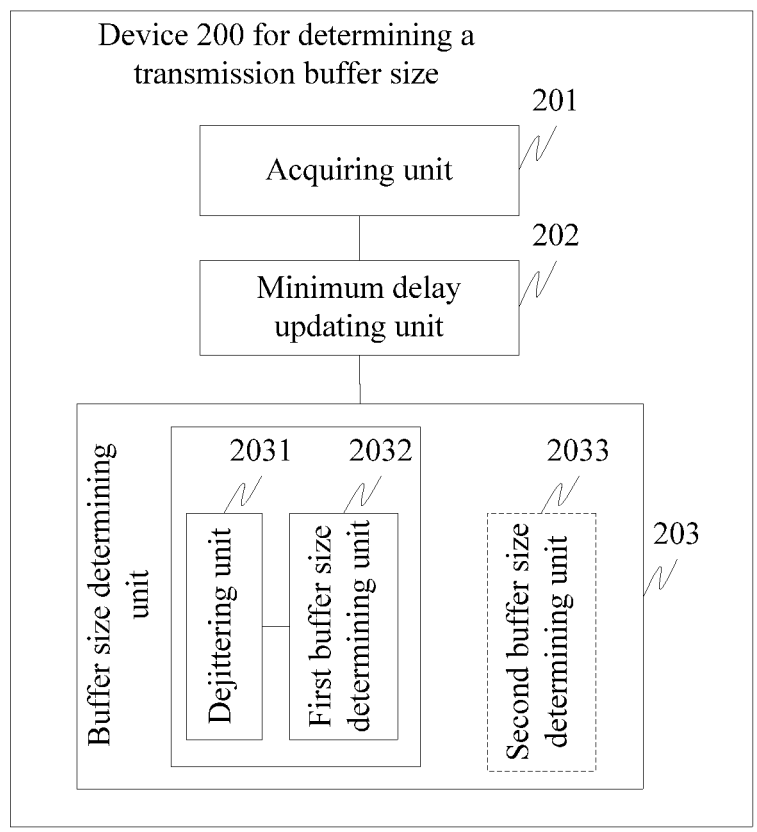
FIG. 3 is a schematic diagram of another device for determining a transmission buffer size according to an embodiment of the present disclosure.

Optionally, as shown in FIG. 3, the buffer size determining unit 203 includes a dejittering unit 2031 and a first buffer size determining unit 2032, or the buffer size determining unit 203 includes a second buffer size determining unit 2033.

The dejittering unit 2031 is configured to perform dejittering processing on the transmission delay to obtain an anti-interference transmission delay of the transmission link.

The first buffer size determining unit 2032 is configured to use a difference between the anti-interference transmission delay obtained by the dejittering unit 2031 and the minimum transmission delay as the transmission buffer size.

The second buffer size determining unit 2033 is configured to calculate a difference between the transmission delay acquired by the acquiring unit 201 and the minimum transmission delay obtained by the minimum delay updating unit 202, and use the difference as the transmission buffer size.

The dejittering unit 2031 may be further configured to obtain the anti-interference transmission delay of the transmission link according to an anti-interference transmission delay calculation function $T_{delay}=f_1(T)$ and the transmission delay, where $T_{delay}$ is the anti-interference transmission delay, T is the transmission delay, and $f_1$ is a low-pass filtering function.

It should be noted that the dejittering unit 2031 may be configured to execute the method in Manner 1 in step 103, and related descriptions are not repeated.

Figure 4:
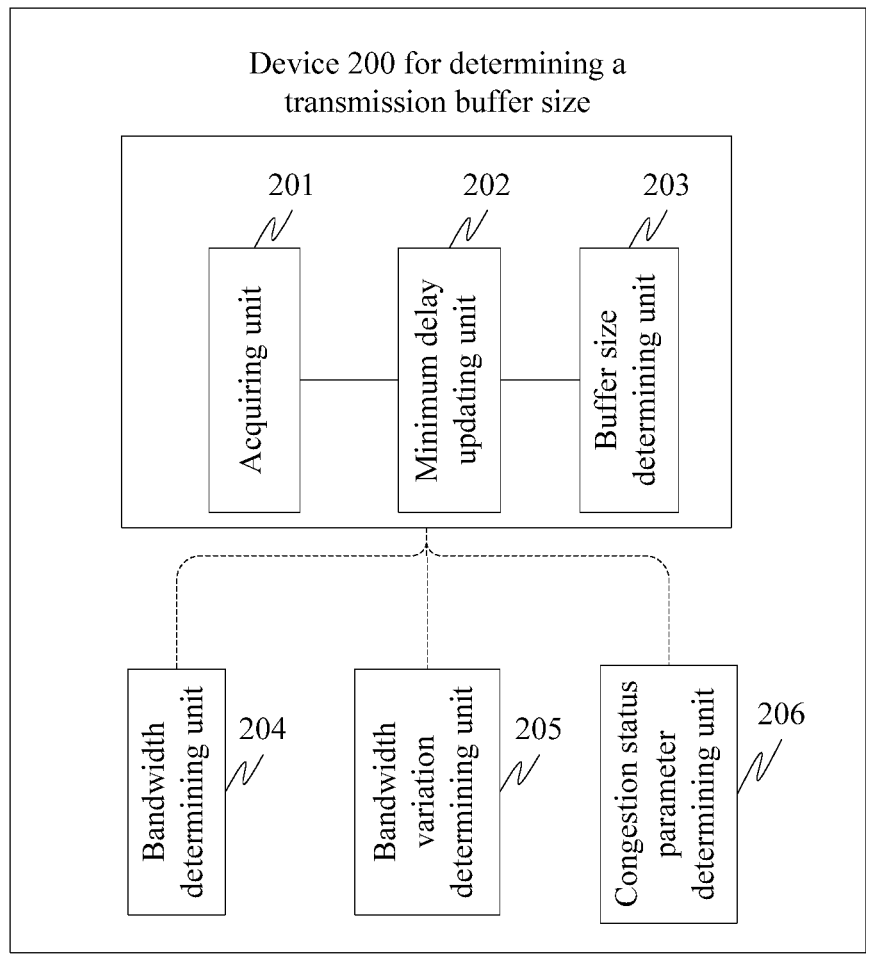
FIG. 4 is a schematic diagram of another device for determining a transmission buffer size according to an embodiment of the present disclosure.

Optionally, as shown in FIG. 4, the device 200 may further include one of a bandwidth determining unit 204, a bandwidth variation determining unit 205, and a congestion status parameter determining unit 206.

The bandwidth determining unit 204 is configured to determine a transmission bandwidth of the transmit end on the transmission link according to the transmission buffer size. The bandwidth variation determining unit 205 is configured to determine a transmission bandwidth variation on the transmission link according to the transmission buffer size, and the congestion status parameter determining unit 206 is configured to determine a high-level congestion status parameter of the transmission link according to the transmission buffer size, where the high-level congestion status parameter is used to indicate a congestion level of the transmission link.

The congestion status parameter determining unit 206 may further perform related operations in step 104a, the bandwidth variation determining unit 205 may be configured to perform related operations in step 104b, and the bandwidth determining unit 204 may be configured to perform related operations in step 104c, which is not repeated herein.

It should be noted that the transmission bandwidth or the transmission bandwidth variation is determined according to the transmission buffer size such that more timely and accurate flow control can be implemented on the transmission link, thereby improving transmission reliability. Additionally, the high-level congestion status parameter is determined according to the transmission buffer size, which greatly improves congestion detection accuracy of the transmission link and provides a reliable support for flow control of the transmission link.

Figure 5:
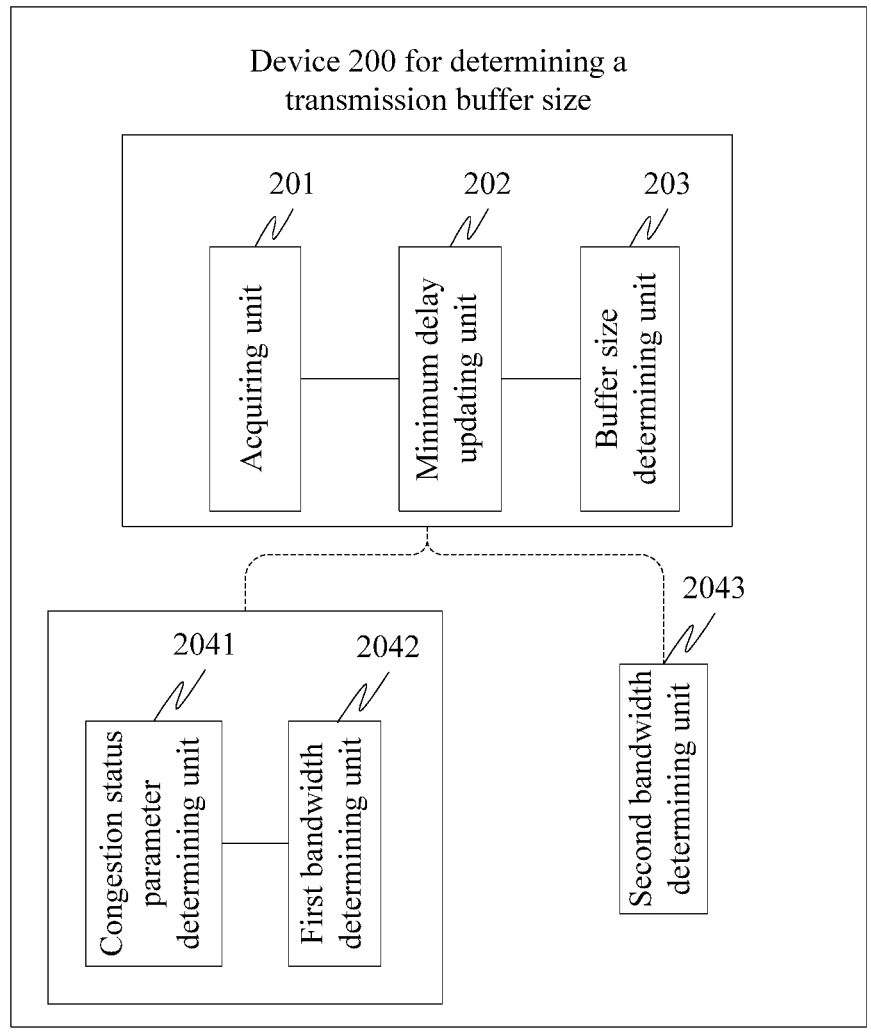
FIG. 5 is a schematic diagram of another device for determining a transmission buffer size according to an embodiment of the present disclosure.

Optionally, as shown in FIG. 5, the bandwidth determining unit 204 includes a congestion status parameter determining unit 2041 and a first bandwidth determining unit 2042, or a second bandwidth determining unit 2043.

The congestion status parameter determining unit 2041 is configured to determine the high-level congestion status parameter of the transmission link according to the transmission buffer size. The first bandwidth determining unit 2042 is configured to determine the transmission bandwidth according to the high-level congestion status parameter determined by the congestion status parameter determining unit 2041, and the second bandwidth determining unit 2043 is configured to determine the transmission bandwidth according to a correspondence between the transmission buffer size and the transmission bandwidth and a correspondence between a preset transmission buffer size and the transmission bandwidth.

The congestion status parameter determining unit 2041 may be further configured to determine the high-level congestion status parameter of the transmission link according to a value relationship between the transmission buffer size and preset buffer size thresholds, where the preset buffer size thresholds include at least two thresholds.

For example, it is assumed that the preset buffer size thresholds are $MemLengthTd_1$, $MemLengthTd_2$, ..., and $MemLengthTd_N$, N is an integer greater than 2, and $MemLengthTd_1 < MemLengthTd_2 <, ..., <MemLengthTd_N$. The high-level congestion status parameter of the transmission link is $TranCongestion_i$, a value of i is set to 1, ..., N, and N+1 respectively, and a congestion level indicated by $TranCongestion_{i+1}$ is severer than a congestion level indicated by $TranCongestion_i$. The congestion status parameter determining unit 2041 is further configured to perform the steps of determining that the high-level congestion status parameter of the transmission link is $TranCongestion_{j+1}$ when the transmission buffer size is greater than $MemLengthTd_j$ and the transmission buffer size is less than or equal to $MemLengthTd_j+1$, where $1 \leq j < N$, and j is an integer, or determining that the high-level congestion status parameter of the transmission link is $TranCongestion_1$ when the transmission buffer size is greater than or equal to 0 and the transmission buffer size is less than or equal to $MemLengthTd_1$, or determining that the high-level congestion status parameter of the transmission link is $TranCongestion_{N+1}$ when the transmission buffer size is greater than $MemLengthTd_N$.

Optionally, the congestion status parameter determining unit 2041 may be further configured to determine a transmission buffer size variable of the transmission link according to the transmission buffer size and a previous transmission buffer size neighboring to the transmission buffer size, and determine the high-level congestion status parameter of the transmission link according to the transmission buffer size, the transmission buffer size variable, and a relationship among a preset transmission buffer size, the transmission buffer size variable, and the high-level congestion status parameter.

The relationship among the preset transmission buffer size, the transmission buffer size variable, and the high-level congestion status parameter is $TranCongestion=f_2(\Delta MemLength, MemLength)$, where TranCongestion is the high-level congestion status parameter of the transmission link, and a larger value of TranCongestion indicates a severer congestion level of the transmission link, $\Delta MemLength$ is the transmission buffer size variable, MemLength is the transmission buffer size, and the function $f_2$ meets conditions (a), (b) and (c), where the conditions (a), (b) and (c) are as follows.

(a) A first $TranCongestion=f_2$(the first $\Delta MemLength$, X) when a value of MemLength is set to X, X is any non-negative number, and when a value of $\Delta MemLength$ is set to a first $\Delta MemLength$, a second $TranCongestion=f_2$(the second $\Delta MemLength$, X) when the value of MemLength is set to X, and the value of $\Delta MemLength$ is set to a second $\Delta MemLength$, and the first TranCongestion<the second TranCongestion if the first $\Delta MemLength$<the second $\Delta MemLength$;

(b) A third $TranCongestion=f_2$(Y, the first MemLength) when the value of $\Delta MemLength$ is set to Y, and Y is an arbitrary number, and when the value of MemLength is set to a first MemLength, a fourth $TranCongestion=f_2$(Y, the second MemLength) when the value of ΔMemLength is Y, and the value of MemLength is set to a second MemLength, and the third TranCongestion<the fourth TranCongestion if the first MemLength<the second MemLength; and (c) A fifth TranCongestion=$f_2$(the first ΔMemLength, the first MemLength) when the value of MemLength is set to the first MemLength, and the value of ΔMemLength is set to the first ΔMemLength, and a sixth TranCongestion=$f_2$(the second ΔMemLength, the second MemLength) when the value of MemLength is set to the second MemLength and the value of ΔMemLength is set to the second ΔMemLength, where the fifth TranCongestion<the sixth TranCongestion if the first MemLength<the second MemLength and the first ΔMemLength/the first MemLength=the second ΔMemLength/the second MemLength>0, or the fifth TranCongestion>the sixth TranCongestion if the first MemLength<the second MemLength and the first ΔMemLength/the first MemLength=the second ΔMemLength/the second MemLength<0.

The first bandwidth determining unit 2042 may be further configured to determine that the transmission bandwidth of the transmission link is a first transmission bandwidth according to a correspondence between the first high-level congestion status parameter and the transmission bandwidth and a correspondence between a preset high-level congestion status parameter and the transmission bandwidth if the high-level congestion status parameter determined by the congestion status parameter determining unit 2041 is a first high-level congestion status parameter, and determine that the transmission bandwidth of the transmission link is a second transmission bandwidth according to a correspondence between the second high-level congestion status parameter and the transmission bandwidth and the correspondence between the preset high-level congestion status parameter and the transmission bandwidth if the high-level congestion status parameter determined by the congestion status parameter determining unit 2041 is a second high-level congestion status parameter, where the correspondence between the preset high-level congestion status parameter and the transmission bandwidth meets conditions the first transmission bandwidth is less than the second transmission bandwidth if the first high-level congestion status parameter is greater than the second high-level congestion status parameter, the first transmission bandwidth is greater than the second transmission bandwidth if the first high-level congestion status parameter is less than the second high-level congestion status parameter, and the first transmission bandwidth is equal to the second transmission bandwidth if the first high-level congestion status parameter is equal to the second high-level congestion status parameter.

Optionally, the first bandwidth determining unit 2042 may be further configured to acquire a current transmission bandwidth $BW_{old}$ of the transmission link, and determine the transmission bandwidth according to the high-level congestion status parameter, $BW_{old}$, and a transmission bandwidth function $BW_{new}=f_3$(TranCongestion, $BW_{old}$), where TranCongestion is the high-level congestion status parameter, $BW_{new}$ is the transmission bandwidth, and a larger value of TranCongestion indicates a severer congestion level of the transmission link, where the function $f_3$ meets conditions a first $BW_{new}=f_3$(the first TranCongestion, $BW_{old}$) when a value of TranCongestion is set to a first TranCongestion, a second $BW_{new}=f_3$(the second TranCongestion, $BW_{old}$) when the value of TranCongestion is set to a second TranCongestion, and the first $BW_{new}$>the second $BW_{new}$ if the first TranCongestion<the second TranCongestion.

Optionally, the first bandwidth determining unit 2042 may be further configured to acquire a quantity of continuous up-regulations of the transmission bandwidth of the transmission link if a high-level congestion status of the transmission link is determined to be non-congested according to the high-level congestion status parameter determined by the congestion status parameter determining unit 2041, and determine a transmission bandwidth adjustment factor of the transmission link according to the quantity of continuous up-regulations of the transmission bandwidth and a first calculation function $\beta=1+f_4(m)$ of the transmission bandwidth adjustment factor, where m is the quantity of continuous up-regulations of the transmission bandwidth, $\beta$ is the transmission bandwidth adjustment factor of the transmission link, and the function $f_4$ meets conditions a first $\beta=1+f_4$(the first m) when a value of m is set to a first m, a second $\beta=1+f_4$(the second m) when the value of m is set to a second m, and the first $\beta$<the second $\beta$ if the first m<the second m, or acquire a quantity of continuous down-regulations of the transmission bandwidth of the transmission link, and determine a transmission bandwidth adjustment factor of the transmission link according to the quantity of continuous down-regulations and a second calculation function $\beta=1-f_5(n)$ of the transmission bandwidth adjustment factor if a high-level congestion status of the transmission link is determined to be congested according to the high-level congestion status parameter determined by the congestion status parameter determining unit 2041, where n is the quantity of continuous down-regulations of the transmission bandwidth, $\beta$ is the transmission bandwidth adjustment factor of the transmission link, and $f_5$ meets conditions a third $\beta=1-f_5$(the first n) when a value of the quantity n of continuous down-regulations of the transmission bandwidth is set to a first n, a fourth $\beta=1-f_5$(the second n) when the value of n is set to a second n, and the third $\beta$<the fourth $\beta$, and $f_5(n)<1$ if the first n<the second n, acquire a current transmission bandwidth $BW_{old}$ of the transmission link, and determine the transmission bandwidth $BW_{new}$ according to the current transmission bandwidth $BW_{old}$, the transmission bandwidth adjustment factor $\beta$ of the transmission link, and a transmission bandwidth calculation formula $BW_{new}=\beta \times BW_{old}$.

The first bandwidth determining unit 2042 may be configured to execute Manner a, Manner b, or Manner c in step 104c, which is not repeated.

Figure 6:
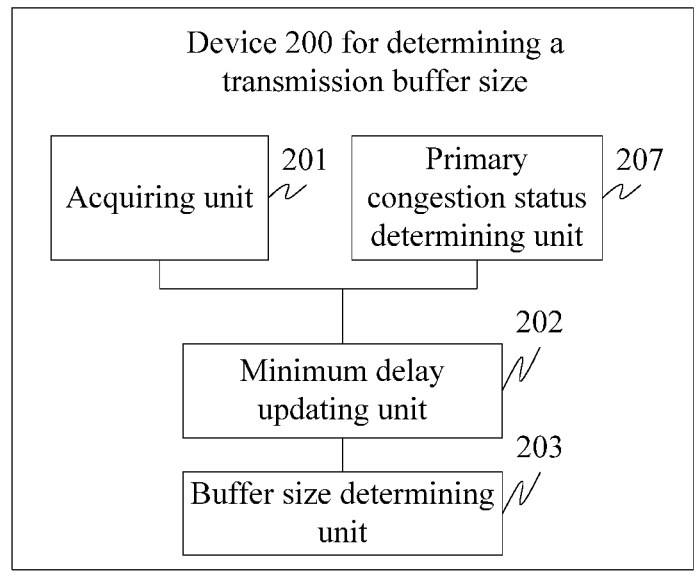
FIG. 6 is a schematic diagram of still another device for determining a transmission buffer size according to an embodiment of the present disclosure.

Further, as shown in FIG. 6, the device 200 may further include a primary congestion status determining unit 207, where the primary congestion status determining unit 207 may be configured to determine the primary congestion status according to data packet sending information of the transmit end and data packet receiving information of the receive end, or determine the primary congestion status according to a comparison result between the transmission delay acquired by the acquiring unit 201 and an average transmission delay of the transmission link within a preset time period.

The data packet sending information of the transmit end is used to indicate a data packet sending status of the transmit end, and the data packet receiving information of the receive end is used to indicate a data packet receiving status of the receive end. For example, the data packet sending information of the transmit end may be a moment at which the transmit end sends the data packet, and the data packet receiving information of the receive end may be a moment at which the receive end receives the data packet correctly, or, the data packet sending information of the transmit end may be a quantity of data packets sent by the transmit end, and the data packet receiving information of the receive end may be a quantity of data packets received by the receive end correctly.

The device 200 for determining a transmission buffer size provided by this embodiment of the present disclosure updates a minimum transmission delay according to a primary congestion status of a transmission link such that when the primary congestion status of the transmission link is congested, an abnormally high point, appearing in a transmission process, of the transmission buffer size can be removed or smoothened in a timely manner, and the minimum transmission delay of the transmission link is more accurate, thereby making a transmission buffer size of the transmission link more accurate to better reflect a current congestion status of the transmission link.

Figure 7:
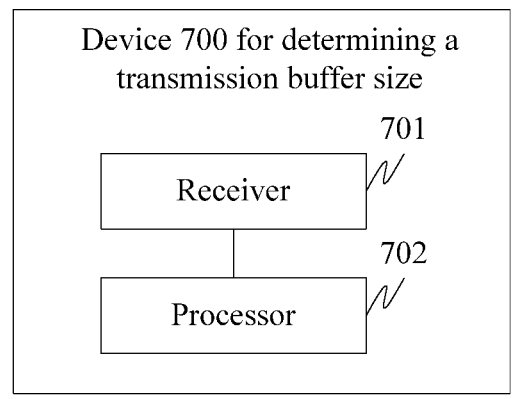
FIG. 7 is a hardware structure diagram of a device for determining a transmission buffer size according to an embodiment of the present disclosure.

As shown in FIG. 7, a device 700 for determining a transmission buffer size provided by an embodiment of the present disclosure includes a receiver 701 and a processor 702, where the receiver 701 is connected to the processor 702. Details are as follows.

The receiver 701 is configured to acquire a transmission delay of a data packet that is sent by a transmit end on a transmission link between the transmit end and a receive end.

The processor 702 is configured to update a minimum transmission delay according to the transmission delay received by the receiver 701 and based on a first update period if a primary congestion status of the transmission link is congested, and update the minimum transmission delay according to the transmission delay and based on a second update period if the primary congestion status is non-congested, where a period length of the first update period is shorter than a period length of the second update period.

The processor 702 is further configured to obtain a minimum transmission delay of the transmission link, and determine a transmission buffer size of the transmission link according to the transmission delay received by the receiver 701 and the minimum transmission delay.

Optionally, the processor 702 is further configured to perform dejittering processing on the transmission delay to obtain an anti-interference transmission delay of the transmission link, and use a difference between the anti-interference transmission delay and the minimum transmission delay as the transmission buffer size, or, calculate a difference between the transmission delay and the minimum transmission delay, and use the difference as the transmission buffer size.

The processor 702 is further configured to obtain the anti-interference transmission delay of the transmission link according to an anti-interference transmission delay calculation function $T_{delay}=f_1(T)$ and the transmission delay, where $T_{delay}$ is the anti-interference transmission delay, T is the transmission delay, and $f_1$ is a low-pass filtering function.

Optionally, the processor 702 is further configured to determine a transmission bandwidth of the transmit end on the transmission link according to the transmission buffer size, or determine a transmission bandwidth variation on the transmission link according to the transmission buffer size, or determine a high-level congestion status parameter of the transmission link according to the transmission buffer size, where the high-level congestion status parameter is used to indicate a congestion level of the transmission link.

It should be noted that, for specific implementation manners of the transmission bandwidth, transmission bandwidth variation, or high-level congestion status parameter, reference may be made to related descriptions in steps 104a, 104b, and 104c, which are not repeated herein.

Optionally, the processor 702 is further configured to determine the primary congestion status according to data packet sending information of the transmit end and data packet receiving information of the receive end, or determine the primary congestion status according to a comparison result between the acquired transmission delay and an average transmission delay of the transmission link within a preset time period.

For the primary congestion status, the data packet sending information of the transmit end, and the data packet receiving information of the receive end, reference may be made to related descriptions in step 100.

It should be noted that the device 700 may be configured to perform steps in the embodiment shown in FIG. 1. For detailed descriptions, reference may be made to related descriptions of the foregoing method embodiments, which are not repeated herein.

The device 700 for determining a transmission buffer size provided by this embodiment of the present disclosure updates a minimum transmission delay according to a primary congestion status of a transmission link such that when the primary congestion status of the transmission link is congested, an abnormally high point, appearing in a transmission process, of the transmission buffer size can be removed or smoothened in a timely manner, and the minimum transmission delay of the transmission link is more accurate, thereby making a transmission buffer size of the transmission link more accurate to better reflect a current congestion status of the transmission link.

A person of ordinary skill in the art may understand that all or a part of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not cause the essence of the technical solutions to depart from the scope of the technical solutions of the embodiments of the present disclosure.

What is claimed is:

1. A method for determining a transmission buffer size, comprising:
    acquiring a transmission delay of a data packet that is sent by a transmit end on a transmission link between the transmit end and a receive end;
    updating a minimum transmission delay according to the transmission delay and based on a first update period when a primary congestion status of the transmission link is congested;
    updating the minimum transmission delay according to the transmission delay and based on a second update period when the primary congestion status is non-congested, wherein a period length of the first update period is shorter than a period length of the second update period;

obtaining the minimum transmission delay of the transmission link; and determining the transmission buffer size of the transmission link according to the transmission delay and the minimum transmission delay.

2. The method according to claim 1, wherein determining the transmission buffer size of the transmission link comprises:

performing dejittering processing on the transmission delay to obtain an anti-interference transmission delay of the transmission link, and setting a first difference between the anti-interference transmission delay and the minimum transmission delay as the transmission buffer size; or calculating a second difference between the transmission delay and the minimum transmission delay, and setting the second difference as the transmission buffer size.

3. The method according to claim 2, wherein performing the dejittering processing on the transmission delay comprises obtaining the anti-interference transmission delay of the transmission link according to an anti-interference transmission delay calculation function and the transmission delay, wherein the anti-interference transmission delay calculation function comprises $T_{delay}=f_1(T)$, wherein the $T_{delay}$ is the anti-interference transmission delay, wherein the T is the transmission delay, and wherein the $f_1$ is a low-pass filtering function.

4. The method according to claim 1, further comprising:
determining a transmission bandwidth of the transmit end on the transmission link according to the transmission buffer size;

determining a transmission bandwidth variation on the transmission link according to the transmission buffer size; or determining a high-level congestion status parameter of the transmission link according to the transmission buffer size, wherein the high-level congestion status parameter is used to indicate a congestion level of the transmission link.

5. The method according to claim 4, wherein determining the transmission bandwidth of the transmit end on the transmission link comprises:

determining the high-level congestion status parameter of the transmission link according to the transmission buffer size, and determining the transmission bandwidth according to the high-level congestion status parameter; or determining the transmission bandwidth according to a correspondence between the transmission buffer size and the transmission bandwidth and a correspondence between a preset transmission buffer size and the transmission bandwidth.

6. The method according to claim 5, wherein determining the transmission bandwidth according to the high-level congestion status parameter comprises:

determining that the transmission bandwidth of the transmission link is a first transmission bandwidth according to a correspondence between a first high-level congestion status parameter and the transmission bandwidth and a correspondence between a preset high-level congestion status parameter and the transmission bandwidth when the high-level congestion status parameter is the first high-level congestion status parameter; and determining that the transmission bandwidth of the transmission link is a second transmission bandwidth according to a correspondence between a second high-level congestion status parameter and the transmission bandwidth and the correspondence between the preset high-level congestion status parameter and the transmission bandwidth when the high-level congestion status parameter is the second high-level congestion status parameter, wherein the correspondence between the preset high-level congestion status parameter and the transmission bandwidth meets the following conditions:

the first transmission bandwidth is less than the second transmission bandwidth when the first high-level congestion status parameter is greater than the second high-level congestion status parameter;

the first transmission bandwidth is greater than the second transmission bandwidth when the first high-level congestion status parameter is less than the second high-level congestion status parameter; and the first transmission bandwidth is equal to the second transmission bandwidth when the first high-level congestion status parameter is equal to the second high-level congestion status parameter.

7. The method according to claim 5, wherein determining the transmission bandwidth according to the high-level congestion status parameter comprises:

acquiring a current transmission bandwidth ($BW_{old}$) of the transmission link; and determining the transmission bandwidth according to the high-level congestion status parameter, $BW_{old}$, and a transmission bandwidth function $BW_{new}=f_3(TranCongestion, BW_{old})$, wherein the TranCongestion is the high-level congestion status parameter, wherein $BW_{new}$ is the transmission bandwidth, wherein a larger value of TranCongestion indicates a severer congestion level of the transmission link, and wherein the function $f_3$ meets the following conditions:

a first $BW_{new}=f_3$(a first TranCongestion, $BW_{old}$) when a value of TranCongestion is set to the first TranCongestion;

a second $BW_{new}=f_3$(a second TranCongestion, $BW_{old}$) when the value of TranCongestion is set to the second TranCongestion; and the first $BW_{new}$>the second $BW_{new}$ when the first TranCongestion<the second TranCongestion.

8. The method according to claim 5, wherein determining the transmission bandwidth according to the high-level congestion status parameter comprises:

acquiring a quantity of continuous up-regulations of the transmission bandwidth of the transmission link when a high-level congestion status of the transmission link is determined to be non-congested according to the high-level congestion status parameter, and determining a transmission bandwidth adjustment factor of the transmission link according to the quantity of continuous up-regulations of the transmission bandwidth and a first calculation function $\beta=1+f_4(m)$ of the transmission bandwidth adjustment factor, wherein m is the quantity of continuous up-regulations of the transmission bandwidth, wherein $\beta$ is the transmission bandwidth adjustment factor of the transmission link, and wherein the function $f_4$ meets the following conditions:

a first $\beta=1+f_4$(a first m) when a value of the m is set to the first m;

a second $\beta=1+f_4$(a second m) when the value of the m is set to the second m; and the first $\beta$<the second $\beta$ when the first m<the second m;

acquiring a quantity of continuous down-regulations of the transmission bandwidth of the transmission link when the high-level congestion status of the transmission link is determined to be congested according to the high-level congestion status parameter, and determining the transmission bandwidth adjustment factor of the transmission link according to the quantity of continuous down-regulations and a second calculation function $\beta=1-f_5(n)$ of the transmission bandwidth adjustment factor, wherein n is the quantity of continuous down-regulations of the transmission bandwidth, and wherein the function $f_5$ meets the following conditions:
  a third $\beta=1-f_5$(a first n) when a value of the n is set to the first n;
  a fourth $\beta=1-f_5$(a second n) when the value of n is set to the second n; and
  the third $\beta<$the fourth $\beta$, and $f_5(n)<1$ when the first n<the second n; and
acquiring a current transmission bandwidth ($BW_{old}$) of the transmission link, and determining the transmission bandwidth ($BW_{new}$) according to the $BW_{old}$, $\beta$, and a transmission bandwidth calculation formula $BW_{new}=\beta \times BW_{old}$.

9. The method according to claim 4, wherein determining the high-level congestion status parameter of the transmission link comprises:
  determining the high-level congestion status parameter of the transmission link according to a value relationship between the transmission buffer size and preset buffer size thresholds, wherein the preset buffer size thresholds comprise at least two thresholds; or
  determining a transmission buffer size variable of the transmission link according to the transmission buffer size and a previous transmission buffer size neighboring to the transmission buffer size, and determining the high-level congestion status parameter of the transmission link according to the transmission buffer size, the transmission buffer size variable, and a relationship among a preset transmission buffer size, the transmission buffer size variable, and the high-level congestion status parameter.

10. The method according to claim 1, further comprising:
  determining the primary congestion status according to data packet sending information of the transmit end and data packet receiving information of the receive end; or
  determining the primary congestion status according to a comparison result between the acquired transmission delay and an average transmission delay of the transmission link within a preset time period.

11. A device for determining a transmission buffer size, wherein the device comprises:
  a receiver; and
  a processor connected to the receiver,
  wherein the receiver is configured to acquire a transmission delay of a data packet that is sent by a transmit end on a transmission link between the transmit end and a receive end, and
  wherein the processor is configured to:
    update a minimum transmission delay according to the transmission delay and based on the transmission delay acquired by the receiver and based on a first update period when a primary congestion status of the transmission link is congested;
    update the minimum transmission delay according to the transmission delay and based on the transmission delay and based on a second update period when the primary congestion status is non-congested, wherein a period length of the first update period is shorter than a period length of the second update period;
    obtain the minimum transmission delay of the transmission link; and
    determine, according to the transmission delay acquired by the receiver and the minimum transmission delay, the transmission buffer size of the transmission link.

12. The device according to claim 11, wherein the processor is further configured to:
  perform dejittering processing on the transmission delay to obtain an anti-interference transmission delay of the transmission link, and set a first difference between the anti-interference transmission delay and the minimum transmission delay as the transmission buffer size; or
  calculate a second difference between the transmission delay and the minimum transmission delay, and set the second difference as the transmission buffer size.

13. The device according to claim 12, wherein the processor is further configured to obtain the anti-interference transmission delay of the transmission link according to an anti-interference transmission delay calculation function and the transmission delay, wherein the anti-interference transmission delay calculation function comprises $T_{delay}=f_1(T)$, wherein the $T_{delay}$ is the anti-interference transmission delay, and wherein the T is the transmission delay, and wherein the $f_1$ is a low-pass filtering function.

14. The device according to claim 11, wherein the processor is further configured to:
  determine a transmission bandwidth of the transmit end on the transmission link according to the transmission buffer size;
  determine a transmission bandwidth variation on the transmission link according to the transmission buffer size; or
  determine a high-level congestion status parameter of the transmission link according to the transmission buffer size, wherein the high-level congestion status parameter is used to indicate a congestion level of the transmission link.

15. The device according to claim 14, wherein the processor is further configured to:
  determine the high-level congestion status parameter of the transmission link according to the transmission buffer size, and determine the transmission bandwidth according to the high-level congestion status parameter; or
  determine the transmission bandwidth according to a correspondence between the transmission buffer size and the transmission bandwidth and a correspondence between a preset transmission buffer size and the transmission bandwidth.

16. The device according to claim 15, wherein the processor is further configured to:
  determine that the transmission bandwidth of the transmission link is a first transmission bandwidth according to a correspondence between a first high-level congestion status parameter and the transmission bandwidth and a correspondence between a preset high-level congestion status parameter and the transmission bandwidth when the high-level congestion status parameter is the first high-level congestion status parameter; and
  determine that the transmission bandwidth of the transmission link is a second transmission bandwidth according to a correspondence between a second high-level congestion status parameter and the transmission bandwidth and the correspondence between the preset high-level congestion status parameter and the transmission bandwidth when the high-level congestion status parameter is the second high-level congestion status parameter, wherein the correspondence between the preset high-level congestion status parameter and the transmission bandwidth meets the following conditions:
the first transmission bandwidth is less than the second transmission bandwidth when the first high-level congestion status parameter is greater than the second high-level congestion status parameter;
the first transmission bandwidth is greater than the second transmission bandwidth when the first high-level congestion status parameter is less than the second high-level congestion status parameter; and
the first transmission bandwidth is equal to the second transmission bandwidth when the first high-level congestion status parameter is equal to the second high-level congestion status parameter.

17. The device according to claim 15, wherein the processor is further configured to:
acquire a current transmission bandwidth ($BW_{old}$) of the transmission link; and
determine the transmission bandwidth according to the high-level congestion status parameter, $BW_{old}$, and a transmission bandwidth function $BW_{new}=f_3(TranCongestion, BW_{old})$, wherein TranCongestion is the high-level congestion status parameter, wherein $BW_{new}$ is the transmission bandwidth, wherein a larger value of TranCongestion indicates a severer congestion level of the transmission link, and wherein the function $f_3$ meets the following conditions:
a first $BW_{new}=f_3$(a first TranCongestion, $BW_{old}$) when a value of TranCongestion is set to the first TranCongestion;
a second $BW_{new}=f_3$(a second TranCongestion, $BW_{old}$) when the value of TranCongestion is set to the second TranCongestion; and
the first $BW_{new}>$the second $BW_{new}$ when the first TranCongestion<the second TranCongestion.

18. The device according to claim 15, wherein the processor is further configured to:
acquire a quantity of continuous up-regulations of the transmission bandwidth of the transmission link when a high-level congestion status of the transmission link is determined to be non-congested according to the high-level congestion status parameter, and determine a transmission bandwidth adjustment factor of the transmission link according to the quantity of continuous up-regulations of the transmission bandwidth and a first calculation function $\beta=1+f_4(m)$ of the transmission bandwidth adjustment factor, wherein m is the quantity of continuous up-regulations of the transmission bandwidth, wherein the $\beta$ is the transmission bandwidth adjustment factor of the transmission link, and wherein the function $f_4$ meets the following conditions:
a first $\beta=1+f_4$(a first m) when a value of the m is set to the first m;
a second $\beta=1+f_4$(a second m) when the value of the m is set to the second m; and
the first $\beta<$the second $\beta$ when the first m<the second m;
acquire a quantity of continuous down-regulations of the transmission bandwidth of the transmission link when the high-level congestion status of the transmission link is determined to be congested according to the high-level congestion status parameter, and determine the transmission bandwidth adjustment factor of the transmission link according to the quantity of continuous down-regulations and a second calculation function $\beta=1-f_5(n)$ of the transmission bandwidth adjustment factor, wherein n is the quantity of continuous down-regulations of the transmission bandwidth, and wherein the function $f_5$ meets the following conditions:
a third $\beta=1-f_5$(a first n) when a value of the n is set to the first n;
a fourth $\beta=1-f_5$(a second n) when the value of n is set to the second n; and
the third $\beta<$the fourth $\beta$, and $f_5(n)<1$ when the first n<the second n;
acquire a current transmission bandwidth ($BW_{old}$) of the transmission link; and
determine the transmission bandwidth ($BW_{new}$) according to the $BW_{old}$, $\beta$, and a transmission bandwidth calculation formula $BW_{new}=\beta \times BW_{old}$.

19. The device according to claim 14, wherein the processor is further configured to:
determine the high-level congestion status parameter of the transmission link according to a value relationship between the transmission buffer size and preset buffer size thresholds, wherein the preset buffer size thresholds comprise at least two thresholds; or
determine a transmission buffer size variable of the transmission link according to the transmission buffer size and a previous transmission buffer size neighboring to the transmission buffer size, and determine the high-level congestion status parameter of the transmission link according to the transmission buffer size, the transmission buffer size variable, and a relationship among a preset transmission buffer size, the transmission buffer size variable, and the high-level congestion status parameter.

20. The device according to claim 11, wherein the processor is further configured to:
determine the primary congestion status according to data packet sending information of the transmit end and data packet receiving information of the receive end; or
determine the primary congestion status according to a comparison result between the transmission delay acquired by the receiver and an average transmission delay of the transmission link within a preset time period.

* * * * *